United States Patent [19]

Jones

[11] Patent Number: 5,060,463
[45] Date of Patent: Oct. 29, 1991

[54] FORWARD MOUNTED HITCH APPARATUS

[76] Inventor: Hollis H. Jones, Star Rte. 1, Box 145, Lusk, Wyo. 82225

[21] Appl. No.: 568,598

[22] Filed: Aug. 16, 1990

[51] Int. Cl.⁵ ................... A01D 34/66; A01B 59/048
[52] U.S. Cl. .................... 56/15.9; 172/273; 172/297; 172/443
[58] Field of Search ........ 56/15.9, 16.2, 16.3, 56/14.9, DIG. 14; 172/439, 443, 273, 297, 298; 280/455.1

[56] References Cited

U.S. PATENT DOCUMENTS

| | | | |
|---|---|---|---|
| 3,516,235 | 6/1970 | Tanoue | 56/16.2 X |
| 4,181,181 | 1/1980 | Old | 172/273 X |
| 4,509,768 | 4/1985 | Haug | 172/273 X |
| 4,940,096 | 7/1990 | Johnson | 172/450 X |

Primary Examiner—David J. Bagnell
Attorney, Agent, or Firm—Zarley, McKee, Thomte, Voorhees & Sease

[57] ABSTRACT

A hitching apparatus is mounted on the forward end of a prime mover to permit the interchangeable connection of various implements. A pair of support members extend from the forward end of the tractor to support a rotatable cross member therebetween. A pair of slotted brackets are operably mounted on the ends of the cross member and connected to the support members via a pair of operable cylinders. Pins through the cross member correspond with the slots in the brackets to permit the cross member to rotate a predetermined amount with respect to the brackets. A shaft extending from the cross member is connected to an implement to raise and lower the implement upon rotation of the cross member.

7 Claims, 5 Drawing Sheets

FORWARD MOUNTED HITCH APPARATUS

TECHNICAL FIELD

The present invention relates generally to a hitching apparatus for tractors and more particularly to an improved hitching apparatus for connecting implements to the forward end of a tractor.

BACKGROUND OF THE INVENTION

Prime movers such as tractors have been utilized for many years to pull implements to work the soil and/or crops. The vast majority of farm implements are designed for attachment to the rear of a tractor so as to access the hitch thereon, and/or the power takeoff.

While the vast majority of implements on the market today follow the prime mover, there are several drawbacks to this orientation. The main problem with an implement which follows the prime mover is that the driver is required to turn around from the direction of travel in order to monitor the implement. Thus, the driver cannot accurately steer the tractor while simultaneously monitoring the implement. While most tractor drivers have become quite adept at this task, it can cause strain on the neck and back muscles of the driver after repeated turning in the driver's seat. Another problem inherent in the use of an implement pulled behind a prime mover, arises in those situations where it would be beneficial to utilize a second implement subsequent to the first implement. While some implements permit the hitching of a second implement to the first implement, it is more typical to utilize a second tractor to pull the second implement, thereby requiring an additional driver and an additional tractor.

While several types of forward mounted implements are available, each implement typically is designed with its own hitching apparatus for connection to the tractor. Thus, the forward mounted implements are not easily interchangeable.

Another problem with conventional forward mounted implements is their requirement that the prime mover have a forward power takeoff to power the implement.

It is therefore a general object of the present invention to provide an improved forward hitching apparatus for a prime mover.

Another object is to provide a forward hitching apparatus which permits the attachment of interchangeable implements.

A further object is to provide a forward mounted rotary drum mower for a prime mover.

These and other objects will be apparent to those skilled in the art.

SUMMARY OF THE INVENTION

The hitching apparatus of the present invention is mounted on the forward end of a prime mover to permit the interchangeable connection of various implements. A pair of support members extend from the forward end of the tractor to support a rotatable cross member therebetween. A pair of slotted brackets are operably mounted on the ends of the cross member and connected to the support members via a pair of operable cylinders. Pins through the cross member correspond with the slots in the brackets to permit the cross member to rotate a predetermined amount with respect to the brackets. A shaft extending from the cross member is connected to an implement to raise and lower the implement upon rotation of the cross member.

In the preferred embodiment of the invention, the implement is a rotary drum mower having first and second drums connected by a hinge pin to permit independent pivotal movement about the hinge pin. The hinge pin extends rearwardly from the drums and is mounted to an inner pipe which is rotatably mounted within an outer pipe, the outer pipe being mounted to the forward end of the shaft. In this fashion, the rotary drum mower is moveable up and down with respect to the hitching apparatus. A shock absorbing apparatus is connected between the hinge pin and the support members on the tractor to absorb the shock of sudden movements of the inner pipe relative to the outer pipe. In this fashion, movement of the mower over foreign objects or into dips in the ground, will be absorbed by the shock absorber and create a "floating" action. Similar shock absorbers extend between the outer pipe and the support members to dampen shocks created by rotational movement of the cross member.

DESCRIPTION OF THE PREFERRED EMBODIMENT

Figure 1:
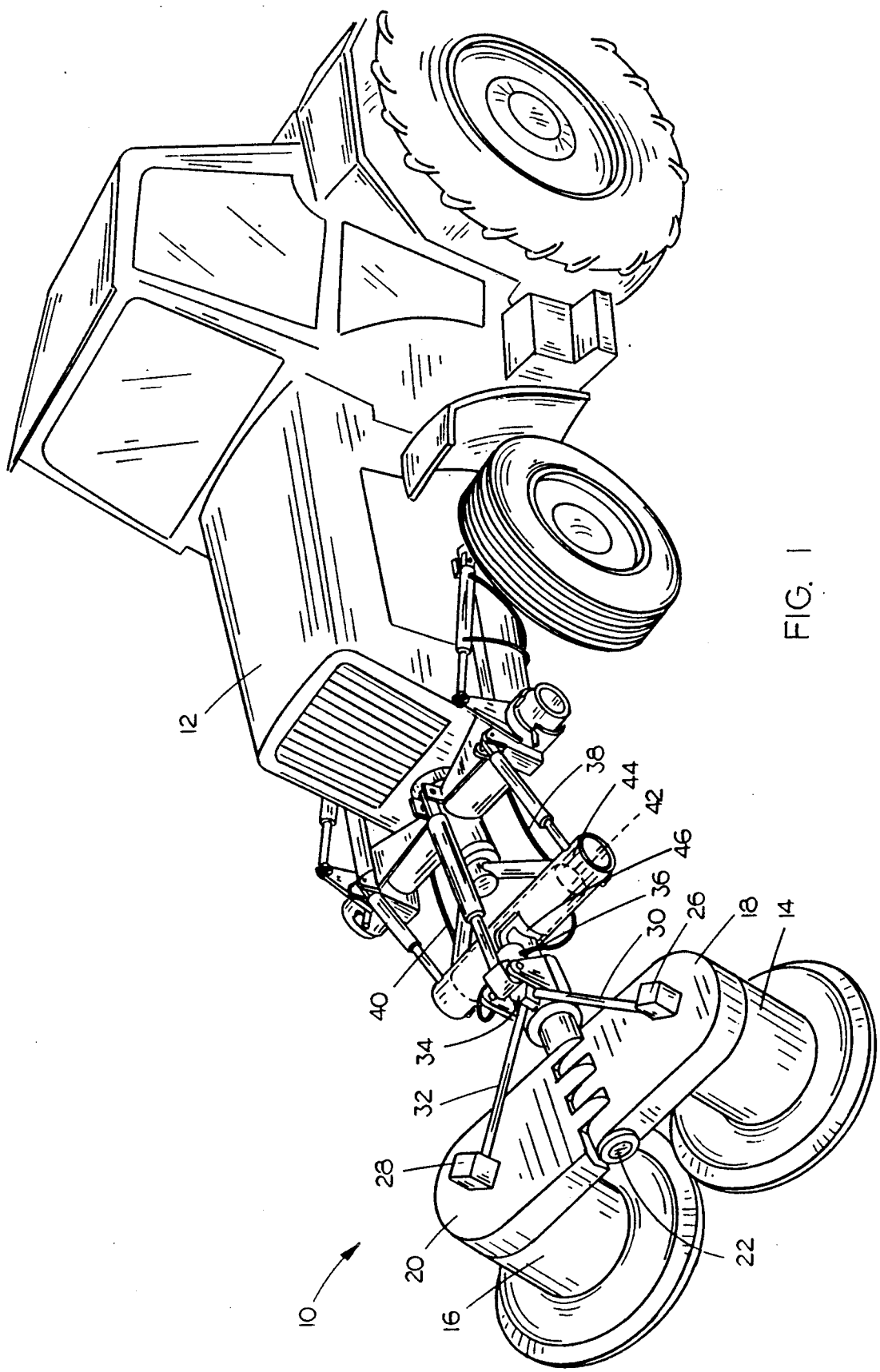
FIG. 1 is a perspective view of the present invention mounted on a tractor.

Referring now to the drawings, in which similar or corresponding parts are identified with the same reference numeral, and more particularly to FIG. 1, the front mounted rotary mower of the present invention is identified generally at 10 and is mounted to the forward end of a tractor 12.

Figure 3:
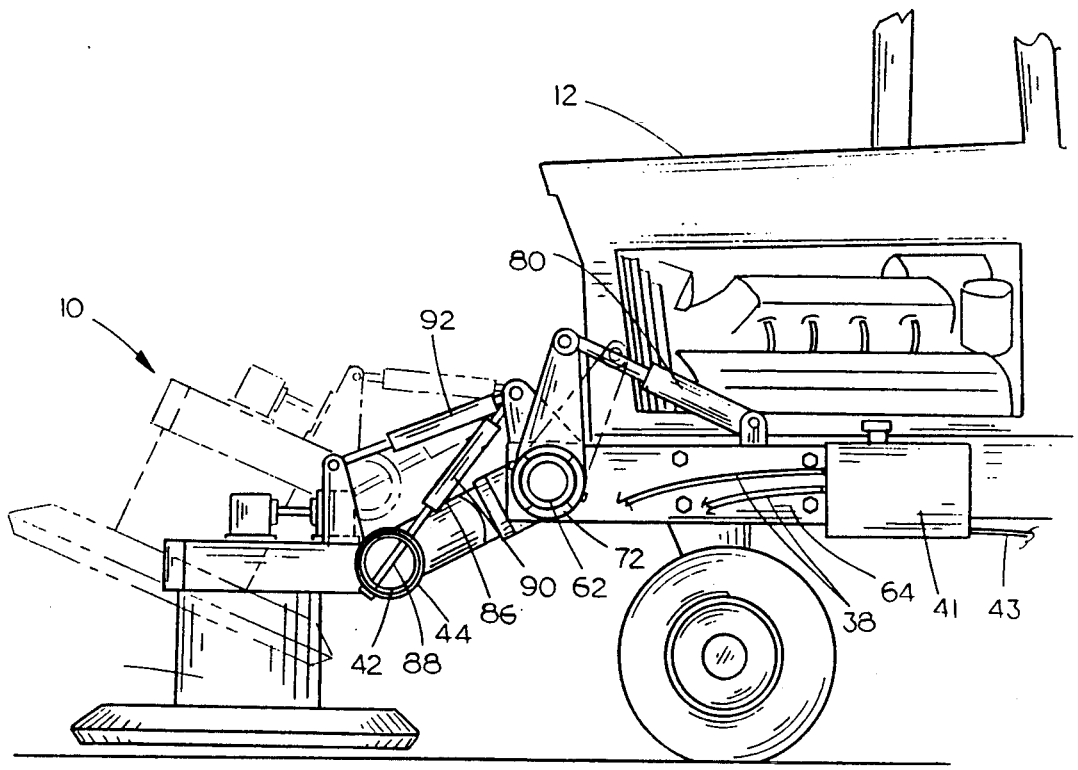
FIG. 3 is a side elevational view of the present invention mounted on a tractor.
Figure 4:
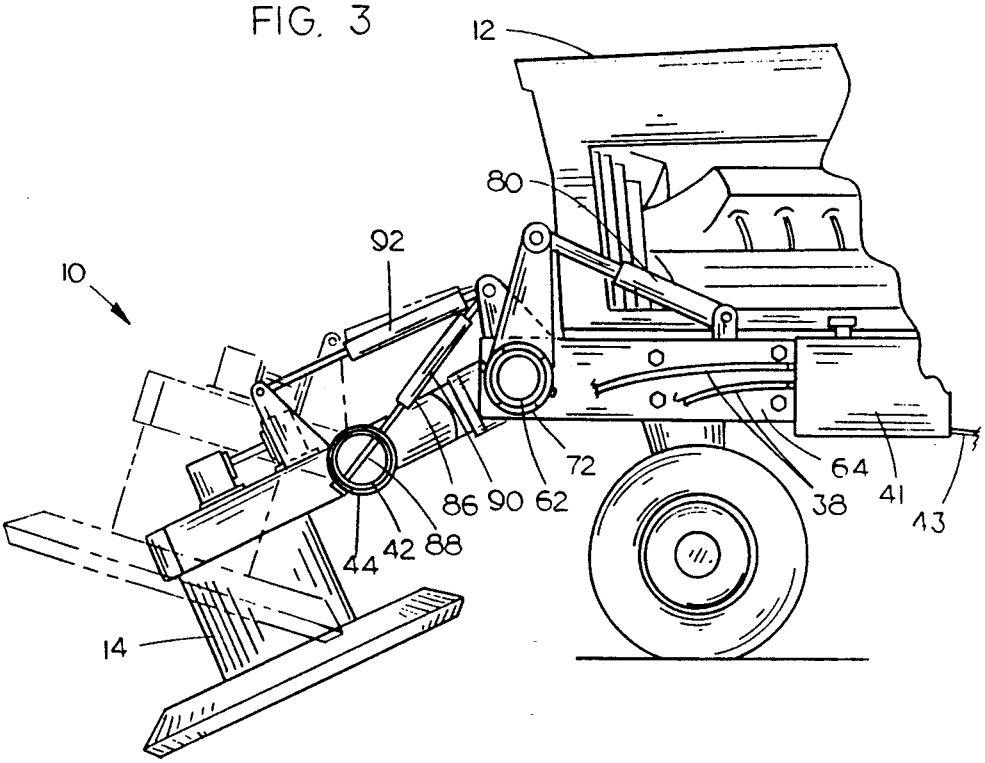
FIG. 4 is a side elevational view similar to FIG. 3.
Figure 5:
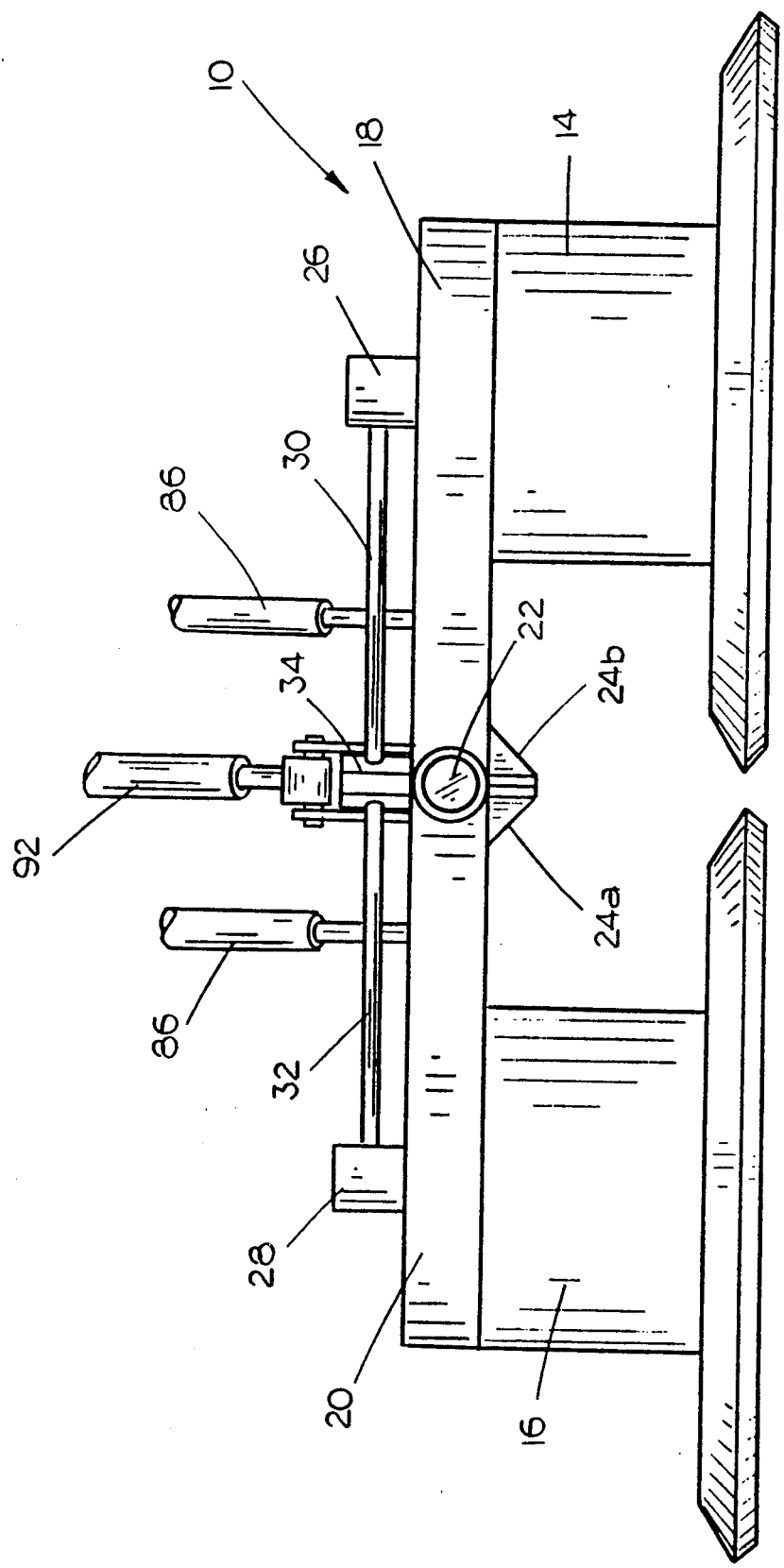
FIG. 5 is a front elevational view of the invention.

Mower 10 includes right and left drums 14 and 16 operably depending from upper housings 18 and 20, respectively. Housings 18 and 20 are hinged together at a hinge pin 22 to permit each drum 14 and 16 to move upwards independently. A pair of stops 24a and 24b mounted on the lower side of housings 18 and 20, as shown in FIG. 5, are located adjacent hinge pin 22 so as to prevent drums 14 and 16 from pivoting downward towards one another beyond a position where housing 18 and 20 are co-planer. Each drum 14 and 16 has an associated gear box 26 and 28 respectively on corresponding housing 18 and 20, from which drive shafts 30 and 32 respectively extend. Drive shafts 30 and 32 extend from a central gear box 34 which is directly connected to a hydraulic motor 36, which serves as the power source for the rotary mower 10. A pair of hydraulic lines 38 and 40 extend from hydraulic motor 36 to a hydraulic fluid reservoir 41 (FIG. 3) on the tractor, which is connected to a power take-off pump (not shown) via hydraulic line 43.

Hinge pin 22 projects rearwardly from housings 18 and 20 and is mounted perpendicularly to an inner pipe 42 which is rotatably mounted within an outer pipe 44. A slot 46 is cut into the side wall of outer pipe 44 at the connection of hinge pin 22 with inner pipe 42, and extends partially around the circumference of outer pipe 44 to permit hinge pin 22 to pivot within a vertical plane, as indicated by arrow 48 in FIG. 2. Central gear box 34 and hydraulic motor 36 are mounted on hinge pin 22 so as to pivot therewith.

Figure 2:
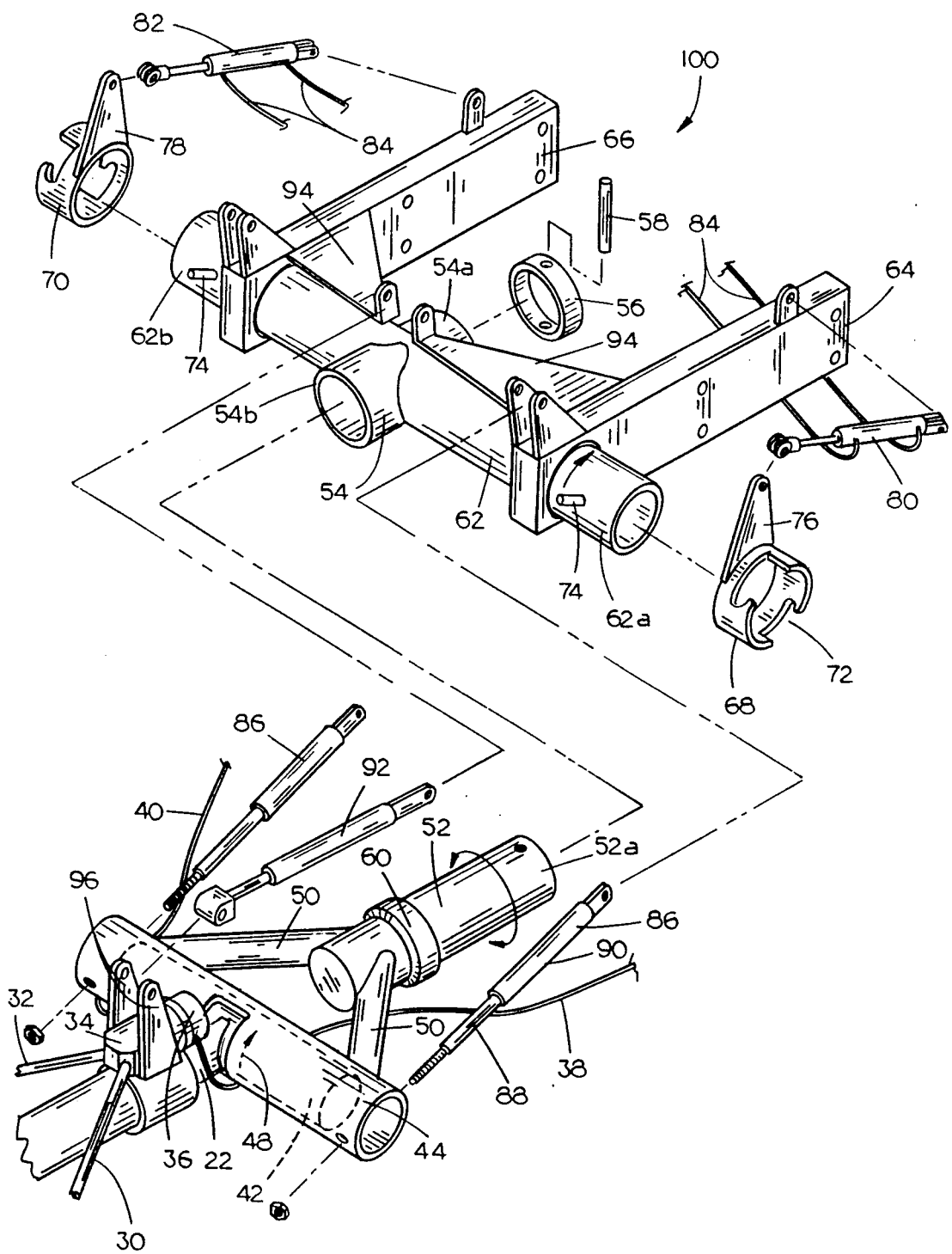
FIG. 2 is an exploded perspective view of the hitching mechanism of the present invention.

As shown in FIGS. 1 and 2, a pair of cross members 50 extend rearwardly from outer pipe 44 and are mounted to a central shaft 52, such that outer pipe 44 is oriented perpendicular to central shaft 52. Central shaft 52 is journaled through a collar 54, with its rearward end 52a projecting rearwardly from collar 54. A ring 56 is mounted on rearward end 52a of central shaft 52 with a pin 58, to prevent forward longitudinal movement of central shaft 52, yet permit rotational movement of central shaft 52. A forward ring 60 is mounted directly on central shaft 52 and will abut against the forward end 54b of collar 54 while ring 56 contacts the rearward end 54a of collar 54.

Collar 54 is mounted on pipe 62, normal thereto, for pivotal movement therewith. Pipe 62 is mounted between a pair of spaced apart support members 64 and 66, and is mounted for rotatable movement along its longitudinal axis. One end 62a of pipe 62 projects beyond support member 64, and the opposite end 62b projects beyond support member 66. A pair of lift collars 68 and 70 are rotatably mounted on ends 62a and 62b. Collars 68 and 70 each have a pair of diametric slots 72 therein oriented along the circumference of collars 68 and 70. Slots 72 will receive an end of a pin 74 journaled through each end 62a and 62b of pipe 62, for purpose described in more detail hereinbelow.

Lift collars 68 and 70 have a projecting arm 76 and 78 respectively mounted for rotation therewith. A pair of hydraulic cylinders 80 and 82 are pivotally mounted at one end to support members 64 and 66 and extend to projecting arms 76 and 78 respectively. Thus, hydraulic arms will rotate lift collars 68 and 70 respectively upon activation. A pair of hydraulic lines 84 extending from cylinders 80 and 82 will connect to the tractors hydraulic system to permit selective extension or retraction of cylinders 80 and 82.

A pair of shock absorbers 86 are pivotally connected at one end to support members 64 and 66 and at the other end to each end of outer pipe 44. Preferably, shock absorbers 86 are of the type having a retractable arm 88 extending within a hollow cylinder 90, and a coil spring within the cylinder designed to bias retractable arm 88 into the retracted position. However, the biasing force of shock absorbers 86 is not great enough to overcome the weight of the mower 10 by themselves. In this way, the biasing of the retractable arms 88 will assist in overcoming the weight of rotary mower 10 in the operating position, to assist in raising the mower 10 upon application of an upward force. In an instance where the mower hits an object on the ground, drums 14 and 16 would be forced upwardly, and the entire rotary mower 10 would raise and go over the object, rather than damaging drums 14 and 16. The weight of the mower 10 would then lower the mower back to the operating position adjacent the ground after the mower has gone past the foreign object. Similarly, if the mower encounters a dip in the ground, the mower's weight will follow the ground and yet be easily raised again when the ground becomes level. Thus, while mower 10 will be supported on the ground similar to conventional mowers, shock absorbers 86 will provide a "floating" action which reduces the shock of foreign objects or dips in the ground, on the mower. Preferably, the springs in shock absorbers 86 are adjustable, such that the biasing force may be adjusted as necessary.

A similar shock absorber 92 is pivotally mounted at one end between a pair of projecting arms 94 extending from support members 64 and 66, and extends forwardly to a pair of uprights 96 on hinge pin 22. Shock absorber 92 assists in pivoting drums 14 and 16 on inner pipe 42 within outer pipe 44, upon contact with a rock or other foreign object. As with shock absorbers 86, drums 14 and 16 will return to their operating positions after going past the foreign object, due to the weight of the drums overcoming the biasing force of the shock absorber 92. Similar to shock absorbers 86, shock absorber 92 will provide a "floating" action to drums 14 and 16.

In operation, the hitching mechanism designated generally at 100 is mounted to the forward end of tractor 12, and will receive central shaft 52 of rotary mower 10. Hydraulic cylinders 80 and 82 are operated to raise and lower mower 10 with respect to the ground. Slots 72 in lift collars 76 and 78 permit pipe 62 to pivot upwardly a short distance, and then return to the desired operating height. This rotational movement of pipe 62 is caused when mower 10 hits a rock or other foreign object and raises to go over the object. Thus, the tractor operator is not required to hydraulically raise and lower mower 10 upon encountering an object. Furthermore, the shock absorbers 86 and 92 in combination with the rotational movement permitted by the slots in lift collars 68 and 70, create a "floating" action of mower 10 over the ground. The biasing of the shock absorbers immediately reacts to contact by drums 14 and 16 with a rock or other foreign object, so as to raise the mower over the object and then drop it down into operating position once again. Furthermore, because central shaft 52 is rotatably connected to pipe 62, mower 10 is capable of rotation about an axis perpendicular to the longitudinal axis of pipe 62. Thus, in those situations where the land slopes to one side or the other, drums 14 and 16 will follow the slope of the land independent of the tractor 12.

Figure 6:
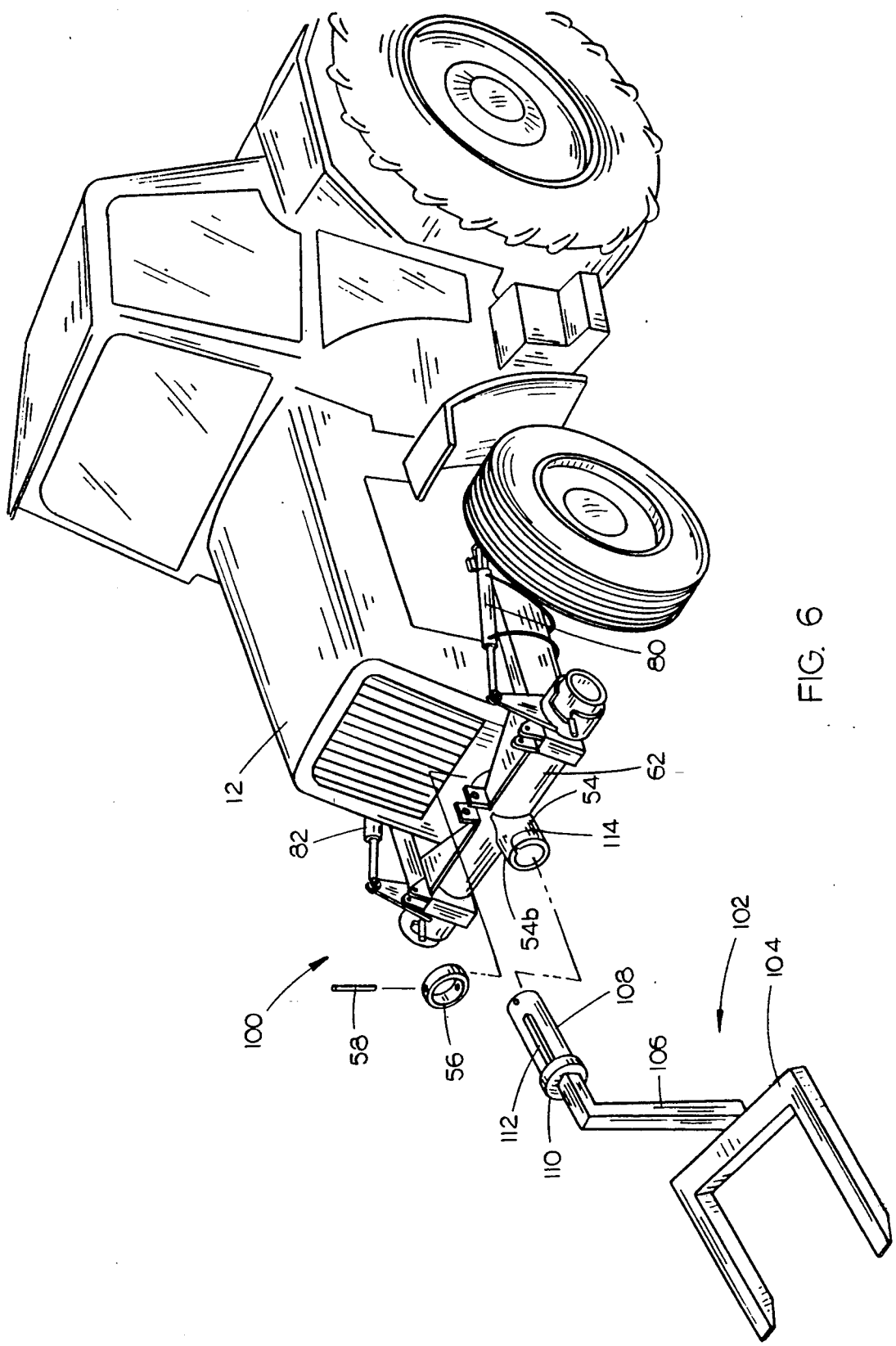
FIG. 6 is a perspective view of a second implement connected to the hitching mechanism of the invention.

The design of hitching mechanism 100 permits the attachment of other implements to the forward end of tractor 12. As shown in FIG. 6, a bale-carrying fork 102 is designed for quick attachment to hitch mechanism 100. Fork 102 includes a fork member 104 mounted to the lower end of a vertical leg 106. Leg 106 has a rearwardly projecting cylindrical end 108 designed to fit through collar 54. The same ring 56 and pin 58 are connected to cylindrical end 108 to prevent forward movement of leg 106 out of collar 54. A ring 110 is mounted forwardly on cylindrical portion 108 to contact the forward end 54b of collar 54.

A longitudinally oriented projecting ridge 112 acts as a key within a slot 114 formed along the interior surface of collar 54, to prevent rotation of cylindrical portion 108 within collar 54. Hydraulic cylinders 80 and 82 are utilized to pivot pipe 62 and thereby raise fork member 102 when connected to hitching mechanism 100.

Hitching mechanism 100 provides a simple apparatus for connecting various implements to the forward end of tractor 12. As shown in FIG. 2, to remove rotary mower 10 from hitching mechanism 100, only requires a few simple steps. First, shock absorbers 86 and 92 are disconnected from support members 64 and 66 and projecting arms 94. Hydraulic lines 38 and 40 are disconnected from the auxiliary lines on the tractor, and then ring 56 is removed from central shaft 52 by removing pin 58. Rotary mower 10 may then be completely removed from hitching mechanism 100.

Whereas the invention has been shown and described in connection with the preferred embodiment thereof, it will be understood that many modifications, substitutions and additions may be made which are within the intended broad scope of the appended claims. There has therefore been shown and described an improved front mounted rotary mower which accomplishes at least all of the above stated objects.

I claim:

1. A hitching apparatus for the forward end of a prime mover frame comprising:
   a pair of spaced-apart support members, having forward and rearward ends;
   means on said support members for connecting the support members to said prime mover frame;
   a cross member operably connected between said support member forward ends for rotatable movement about the longitudinal axis of the cross member, oriented generally perpendicular to said support members;
   means connected between said support members and said cross member for selectively rotating said cross member;
   a shaft means having forward and rearward ends, removably connected at its rearward end to said cross member and oriented generally normal thereto, said shaft means connected for movement with said cross member such that the forward end of the shaft means will move up and down upon rotation of the cross member;
   said shaft means being rotatably connected to said cross member for rotation about an axis normal to the cross member; and
   said shaft means having an implement attached to the forward end thereof.

2. A hitching apparatus for the forward end of a prime mover frame comprising:
   a pair of spaced-apart support members, having forward and rearward ends;
   means on said support members for connecting the support members to said prime mover frame;
   a cross member operably connected between said support member forward ends for rotatable movement about the longitudinal axis of the cross member, oriented generally perpendicular to said support members;
   means connected between said support members and said cross member for selectively rotating said cross member;
   said means for selectively rotating said cross member including;
      a bracket operably mounted on said cross member for rotation about the longitudinal axis of the cross member and operable to selectively rotate said cross member;
      said bracket having an arm projecting therefrom for movement with said bracket;
      operable cylinder means connected between said projecting arm and said support members, operable to rotate said bracket about said axis;
   a shaft means having forward and rearward ends, removably connected at its rearward end to said cross member and oriented generally normal thereto, said shaft means connected for movement with said cross member such that the forward end of the shaft means will move up and down upon rotation of the cross member; said shaft means having an implement attached to the forward end thereof.

3. The hitching apparatus of claim 2, further comprising:
   said bracket having a slot extending partially around the circumference thereof; and
   a pin mounted on said cross member for rotation therewith, said pin projecting through said slot such that movement of the implement upwardly over a foreign object will raise the forward end of said shaft and rotate said cross member to thereby rotate said pin within said slot.

4. A hitching apparatus for the forward end of a prime mover frame comprising:
   a pair of spaced-apart support members, having forward and rearward ends;
   means on said support members for connecting the support members to said prime mover frame;
   a cross member operably connected between said support member forward ends for rotatable movement about the longitudinal axis of the cross member, oriented generally perpendicular to said support members;
   means connected between said support members and said cross member for selectively rotating said cross member;
   a shaft means having forward and rearward ends, removably connected at its rearward end to said cross member and oriented generally normal thereto, said shaft means connected for movement with said cross member such that the forward end of the shaft means will move up and down upon rotation of the cross member;
   said shaft means having an implement operably connected to the forward end thereof, said operable connection including:
   an outer pipe mounted normal to the forward end of said shaft;
   an inner pipe rotatably mounted within said outer pipe;
   said outer pipe having a slot formed therein to permit access to the inner pipe;
   said implement having a pin extending rearwardly therefrom mounted to said inner pipe, such that the implement is hingedly connected to the shaft.

5. The hitching apparatus of claim 4, further comprising shock absorbing means for absorbing shocks caused by sudden rotation of said inner pipe within the outer pipe, connected between said implement pin and said support members.

6. The hitching apparatus of claim 4, further comprising shock absorbing means for absorbing shocks caused by sudden rotation of said cross member with respect to said brackets, connected between said outer pipe and said support members.

7. The hitching apparatus of claim 4, wherein said implement is a rotary drum mower, and further includes:
   a first drum operably supported from a first housing;
   a second drum operably supported from a second housing; said first and second housing being hingedly connected to said pin for independent pivotal movement about said pin; and means for powering said drums.

* * * * *